United States Patent
Stegmueller et al.

(10) Patent No.: US 9,994,111 B2
(45) Date of Patent: Jun. 12, 2018

(54) METHOD FOR PERFORMING A JUMP STARTING OPERATION OR A REMOTE CHARGING OPERATION OF VEHICLES

(71) Applicant: Robert Bosch GmbH, Stuttgart (DE)

(72) Inventors: Holger Stegmueller, Boeblingen (DE); Roger Flattich, Wiernsheim (DE)

(73) Assignee: Robert Bosch GmbH, Stuttgart (DE)

( * ) Notice: Subject to any disclaimer, the term of this patent is extended or adjusted under 35 U.S.C. 154(b) by 342 days.

(21) Appl. No.: 14/636,348

(22) Filed: Mar. 3, 2015

(65) Prior Publication Data

US 2015/0251550 A1 Sep. 10, 2015

(30) Foreign Application Priority Data

Mar. 4, 2014 (DE) .................. 10 2014 203 931

(51) Int. Cl.
*H02J 7/00* (2006.01)
*B60L 11/18* (2006.01)
(Continued)

(52) U.S. Cl.
CPC ............. *B60L 11/1811* (2013.01); *B60L 7/14* (2013.01); *B60L 11/14* (2013.01); *B60L 11/1816* (2013.01); *B60L 11/1861* (2013.01); *B60L 15/20* (2013.01); *B60L 2210/30* (2013.01); *B60L 2210/40* (2013.01); *B60L 2240/36* (2013.01); *B60L 2260/22* (2013.01); *B60L 2260/26* (2013.01); *Y02T 10/645* (2013.01); *Y02T 10/70* (2013.01); *Y02T 10/7005* (2013.01); *Y02T 10/705* (2013.01); *Y02T 10/7044* (2013.01);
(Continued)

(58) Field of Classification Search
USPC .................................................. 320/104–105
See application file for complete search history.

(56) References Cited

U.S. PATENT DOCUMENTS

| 2004/0164703 | A1  | 8/2004 | Berels |
| 2007/0216340 | A1* | 9/2007 | Iura et al. ............... H02P 27/06 318/801 |

(Continued)

FOREIGN PATENT DOCUMENTS

| DE | 102004008817 | 10/2004 |
| DE | 102006016138 | 10/2007 |

(Continued)

*Primary Examiner* — Samuel Berhanu
(74) *Attorney, Agent, or Firm* — Michael Best & Friedrich LLP

(57) ABSTRACT

A method for performing a jump starting operation or a remote charging operation of a recipient vehicle. A current path from an inverter to an electric drive of the donor vehicle is disconnected. For the jump starting operation, the inverter of the donor vehicle is connected on the output side to the electric drive of the recipient vehicle and the inverter of the donor vehicle is operated in the virtual driving operation mode and the electric drive of the recipient vehicle is started. During the remote charging operation, the inverter of the donor vehicle is connected on the output side to the inverter of the recipient vehicle and is operated in the virtual driving operation mode, while the inverter of the recipient vehicle is operated in the virtual recuperation operation mode and charges the discharged battery of the recipient vehicle.

12 Claims, 3 Drawing Sheets

(51) Int. Cl.
 *B60L 7/14* (2006.01)
 *B60L 11/14* (2006.01)
 *B60L 15/20* (2006.01)

(52) U.S. Cl.
 CPC ........ *Y02T 10/7072* (2013.01); *Y02T 10/7077* (2013.01); *Y02T 10/7241* (2013.01); *Y02T 10/7275* (2013.01); *Y02T 90/127* (2013.01); *Y02T 90/14* (2013.01); *Y02T 90/168* (2013.01); *Y04S 30/12* (2013.01)

(56) References Cited

U.S. PATENT DOCUMENTS

| | | |
|---|---|---|
| 2008/0100259 A1 | 5/2008 | Tabatowski-Bush |
| 2010/0000813 A1 | 1/2010 | Wagner |
| 2010/0213889 A1* | 8/2010 | O'Reilly ............ B60L 11/1816 320/105 |
| 2011/0202418 A1* | 8/2011 | Kempton ............ B60L 11/1824 705/26.1 |
| 2012/0286720 A1* | 11/2012 | Fassnacht ............ B60L 3/0046 320/105 |
| 2012/0303397 A1* | 11/2012 | Prosser ................ H02J 7/0054 705/7.12 |
| 2013/0175973 A1* | 7/2013 | Jones ................ B60L 11/1809 320/105 |
| 2013/0264995 A1* | 10/2013 | Lee .................... B60L 11/1803 320/104 |

FOREIGN PATENT DOCUMENTS

| | | |
|---|---|---|
| DE | 102010048673 | 4/2012 |
| JP | 2009154847 | 7/2009 |
| WO | 2011026721 | 3/2011 |

\* cited by examiner

METHOD FOR PERFORMING A JUMP STARTING OPERATION OR A REMOTE CHARGING OPERATION OF VEHICLES

BACKGROUND OF THE INVENTION

The invention relates to a method for performing a jump starting operation or a remote charging operation of a recipient vehicle having a discharged high-voltage traction battery by means of a donor vehicle having a charged high voltage traction battery.

Owing to unfavorable circumstances, the situation may arise whereby a rechargeable battery of a hybrid vehicle used for starting the internal combustion engine via a high voltage network is empty or has such a low state of charge that continued travel is no longer possible. Hybrid vehicles generally do not have starter motors which can be operated on the conventional 12 volt vehicle electrical distribution system. In this case, this vehicle would need to be towed to the next charging station. The same situation can arise in the case of an electrically driven vehicle in which the rechargeable battery, i.e. the high-voltage traction battery, is empty or has such a low state of charge that continued travel is not possible.

WO 2011/026721 A2 relates to a jump starting method and a device for implementing this method. The method and the device relate to jump starting in the case of vehicles with an electric drive, wherein a vehicle has a discharged battery and another vehicle is used for jump starting. The two vehicles each comprise a rectifier and a DC to DC converter in order to charge the respective batteries thereof in the case of use with the public electric grid. In order to provide jump starting, the DC networks of the two vehicles are connected to one another via a cable. The required voltage matching and power control is in this case performed by the DC to DC converter of the vehicle expecting jump starting. In addition, it is disclosed that a connection between the control devices of the two vehicles is produced via the jumper cable in order to monitor the jumping operation. WO 2011/026721 A2 discloses a jump starting method in which a connection is produced between the control devices of the two vehicles involved.

DE 10 2004 008 817 A1 relates to a method and an apparatus for charging a battery using two voltage electrical systems. The high voltage battery of a vehicle is charged via a jumper cable. The vehicle comprises two DC networks, namely a 42 volt network for driving a starter/generator and furthermore a 12 volt network for operating the lighting and the remaining electrical or electronic systems. The starter/generator is used to start the motor of the vehicle. If this vehicle is intended to be jump started, the 12 volt battery is connected to a jumper cable. In this case, the high voltage battery of the vehicle can be charged via a DC-to DC converter.

US 2008/0100259 A1 discloses a jump starting apparatus as its subject matter. Said jump starting apparatus is connected to the high-voltage battery and the battery management system of a vehicle. The apparatus comprises converters for drawing the electrical energy required for charging either from the public electric grid or from other sources, for example from a 12 volt source.

JP 2009 154847 A relates to a control device for a vehicle with a hybrid drive. This vehicle comprises a high voltage battery and an auxiliary battery. Suitable devices are provided for charging the high voltage battery with the aid of the auxiliary battery, wherein this charging operation is monitored by a control device.

In the case of hybrid vehicles or in the case of electric vehicles, it should be taken into consideration that, in the case of a vehicle with an operation ready battery, some of the energy of said battery can be output to a vehicle which is not operation ready so that continued travel of the latter vehicle to the next charging station is possible. The resultant problem is the fact that differently charged batteries or batteries with a different maximum voltage cannot be connected directly since the currents resulting from the voltage difference are only limited by the resistance of a connection between the two vehicles. For this reason, the currents occurring are much too high or even impossible owing to the different voltage potentials between the batteries.

SUMMARY OF THE INVENTION

The invention proposes a method for performing a jump starting operation or a remote charging operation of a recipient vehicle having a discharged high-voltage traction battery by means of a donor vehicle having a charged high voltage traction battery, in which method the following method steps are performed:

a) a current path from an inverter to an electric drive of the donor vehicle is interrupted, b) then, the inverter of the donor vehicle is connected on the output side to the electric drive of the recipient vehicle, the inverter of the donor vehicle is operated in the virtual driving operation mode and the electric drive of the recipient vehicle is started or, in the case of the jump starting operation, c) the inverter of the donor vehicle is connected on the output side to the inverter of the recipient vehicle, the inverter of the donor vehicle is operated in the virtual driving operation mode and the inverter of the recipient vehicle is operated in the virtual recuperation operation mode for charging the discharged high voltage fraction battery.

The proposed solution according to the invention advantageously enables the use of components already provided on hybrid vehicles or electric vehicles so that additional complexity can be avoided or can be minimized to what is absolutely necessary. Via a virtual driving operation mode which can be set at the inverters of hybrid vehicles or electric vehicles, the desired charging currents can be preset and very high quantities of energy can be transferred between the vehicles in a short period of time.

In a further configuration of the solution on which the invention is based, in accordance with method step a), the disconnection of the current path between the inverter and the electric drive of the donor vehicle is performed by means of a plug, a contactor or a switchbox.

Furthermore, in an advantageous configuration of the concept on which the invention is based, the donor vehicle and the recipient vehicle are connected to one another via a charging connection. The charging connection is in the form of a multiple core cable, for example, in which additional cores are provided for producing a communication between the donor vehicle and the recipient vehicle. The charging cable is preferably rated for a low resistance and is capable of transmitting the charging currents which are set at the inverters without transferring an impermissibly high level of heat from the charging cable to the recipient vehicle. According to the method proposed in accordance with the invention, the inverters of the hybrid vehicles or electric vehicles involved in the remote charging operation or in the jump starting operation can be operated in a virtual driving operation mode, in which DC voltage from the high voltage traction battery can be converted into an AC voltage for supplying power to the electric drives. The inverters are therefore bidirectionally operable and, in the recuperation mode, convert an AC voltage generated by the electric drives during generator operation into a DC voltage, with which the high voltage traction battery can be charged.

The communication between the donor vehicle and the recipient vehicle can take place, for example, via the charging connection, thus advantageously via modulation of the charging current, for example. Alternatively, there is the possibility of producing the communication between the donor vehicle and the recipient vehicle via a radio link.

During the remote charging operation, in which a discharged high voltage traction battery of the recipient vehicle is charged via the inverter provided in the recipient vehicle, which is operated in the recuperation mode, the electric drive of the recipient vehicle as well is disconnected from the respective inverters.

The method proposed according to the invention can advantageously be used for performing a jump starting operation or a remote charging operation of hybrid electric vehicles (HEVs), plug in hybrid electric vehicles (PHEVs) or electric vehicles (EVs).

The advantages of the solution proposed according to the invention consist in that components which are installed in any hybrid or electric vehicle can be used for performing the remote charging operation or the jump starting operation. As a result, the additional complexity is kept within limits and in particular the components required for the remote charging operation could be included in the standard equipment of any electric vehicle. Depending on the way in which the virtual driving operation mode is set at the inverter of the donor vehicle, charging currents of virtually any desired level can be set so that very large quantities of energy can be transferred between the donor vehicle and the recipient vehicle in a very short period of time without an additional infrastructure being required both for the remote charging operation and for the jump starting operation.

BRIEF DESCRIPTION OF THE DRAWINGS

The invention will be described in more detail below with reference to the drawing, in which.

DETAILED DESCRIPTION

Figure 1:
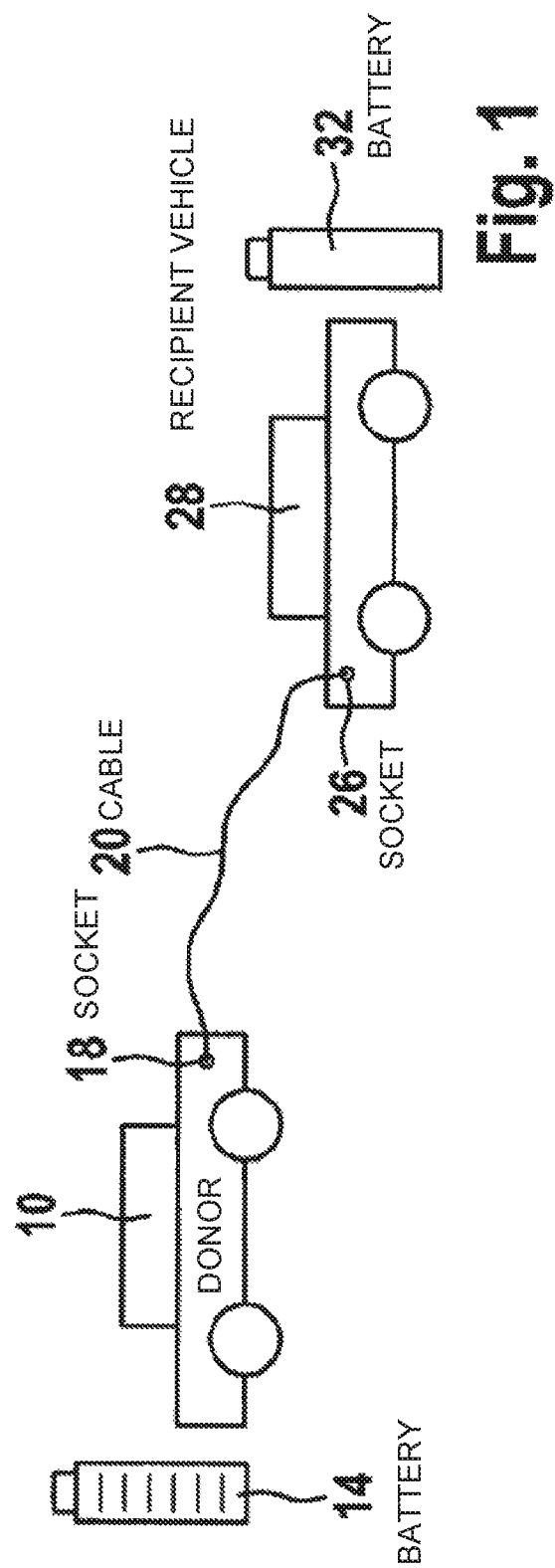
FIG. 1 shows a schematic illustration of a donor vehicle and a recipient vehicle which are connected to one another via a charging connection.

The illustration shown in FIG. 1 shows a schematic connection between a donor vehicle and a recipient vehicle.

It should first be mentioned that a donor vehicle 10 and a recipient vehicle 28 in accordance with the schematic illustration in FIG. 1 can be either a hybrid vehicle which has a conventional internal combustion engine and an electric drive comprising a high-voltage traction battery or electric vehicles, which are exclusively electrically driven and likewise have a high-voltage traction battery. Hybrid vehicles are generally no longer equipped with a starter motor for starting the internal combustion engine which is operated via a 12 volt vehicle electrical distribution system.

FIG. 1 shows a donor vehicle 10, which has a charged high voltage traction battery 14, and an output socket 18. A charging connection 20, for example in the form of a multiple core charging cable, is connected to the output socket 18, which multiple core charging cable extends to a corresponding input socket 26 of a recipient vehicle 28.

As indicated in FIG. 1, the recipient vehicle 28 has a discharged high-voltage traction battery 32.

Figure 2:
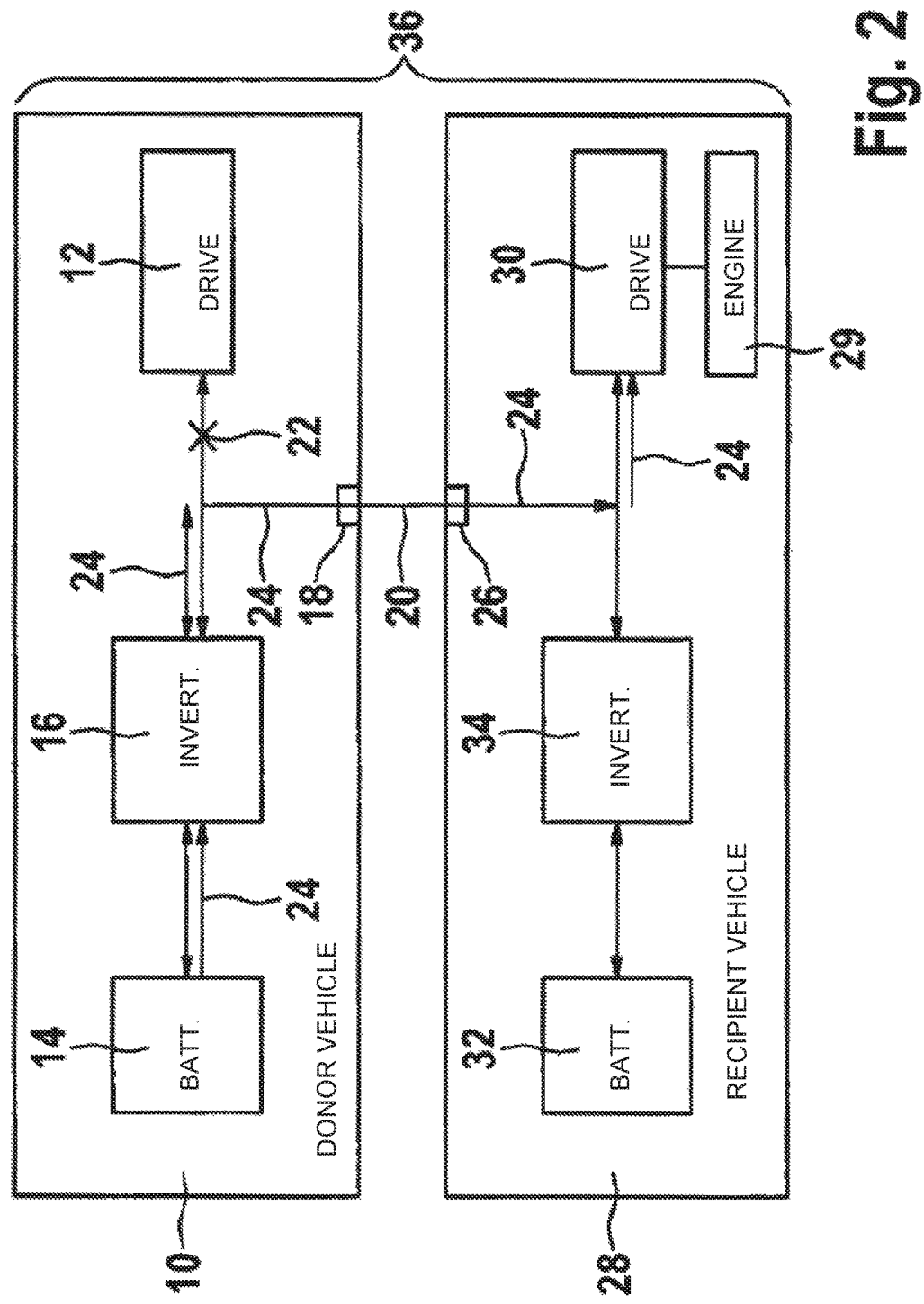
FIG. 2 shows a schematic illustration of the involved components of the donor vehicle and the recipient vehicle in the "jump starting operation" mode.

FIG. 2 shows the components of a donor vehicle and a recipient vehicle and a current path, which is established between these components in the case of a jump starting operation.

The donor vehicle 10 shown in FIG. 2 comprises the charged high voltage fraction battery 14, an inverter 16 which operates in the bidirectional mode and an electric drive 12. The inverter 16 of the donor vehicle 10 operates bidirectionally, i.e. in the recuperation mode it charges the high voltage battery 14 with a DC voltage and, in the driving operation mode, it supplies an AC voltage to the electric drive 12.

As shown in the illustration in FIG. 2, the donor vehicle 10 is connected to a recipient vehicle 28 via a charging connection 20. The recipient vehicle 28 contains a largely discharged high-voltage traction battery 32 and likewise an inverter 34, as well as an electric drive 30.

The donor vehicle 10 and the recipient vehicle 28 are connected via the charging connection 20, which may be a multiple core charging cable or the like. The charging connection 20 is connected to the output socket 18 of the donor vehicle 10 and to the input socket 26 of the recipient vehicle 28. In the jump starting operation mode 36 illustrated in FIG. 2, there is a current path 24. This extends from the almost completely charged high-voltage traction battery 14 to the inverter 16. A connection between the inverter 16 and the electric drive 12 of the donor vehicle 10 is interrupted by means of an interruption 22; the current path 24 extends on the output side from the inverter 16 of the donor vehicle 10 via the output socket 18, the charging connection 20 to the input socket 26 of the recipient vehicle 28 and from there to the electric drive 30 of the recipient vehicle 28. If the inverter 16 of the donor vehicle 10 is being operated in the virtual driving operation mode, said inverter does not feed the electric drive 12 of the donor vehicle 10 but, via the charging connection 20, directly the electric drive 30 of the recipient vehicle 28, owing to the disconnected connection 22. This is illustrated by the current path indicted by reference symbol 24.

For the case where the recipient vehicle 28 is a hybrid vehicle with an internal combustion engine 29, the following applies:

If the electric drive 30 of the recipient vehicle 28 is fed via the donor vehicle 10, the internal combustion engine 29 provided in the hybrid vehicle is started via said donor vehicle. The inverter 34 in the recipient vehicle 28 in this case only has a passive role and can be used, for example, for monitoring the jumping operation, or is inactive until the jumping operation has come to an end.

Figure 3:
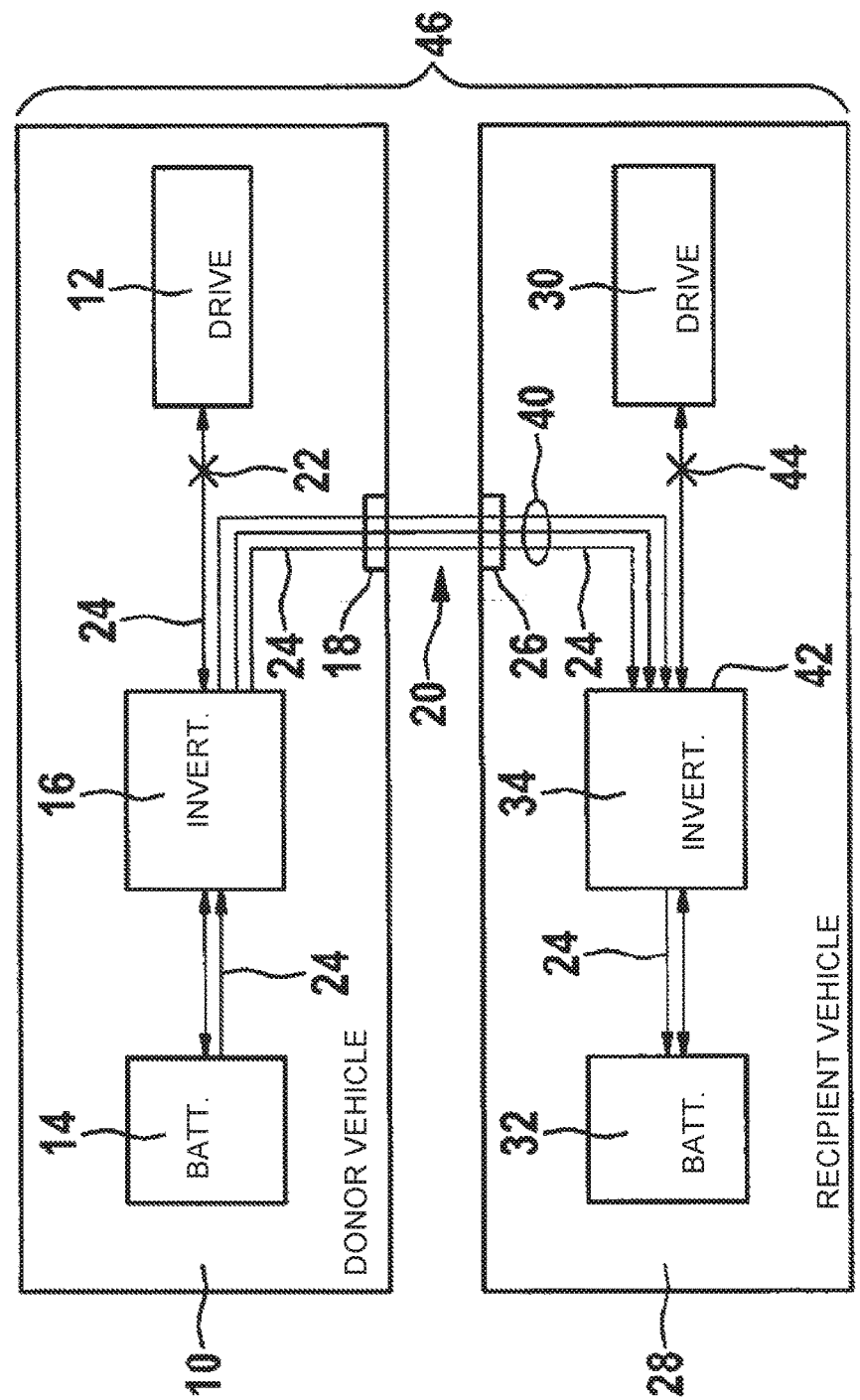
FIG. 3 shows the involved components and connections between the donor vehicle and the recipient vehicle in the "remote charging operation" mode.

FIG. 3 shows a donor vehicle and a recipient vehicle 28, which are connected to one another via a charging connection in the "remote charging operation" mode.

FIG. 3 shows that, in this case too, the donor vehicle 10 comprises a charged high-voltage traction battery 14, and in addition a bidirectionally active inverter 16 and the electric drive 12. The recipient vehicle 28 comprises the largely discharged high voltage traction battery 32, as well as a bidirectionally active inverter 34 and the electric drive 30.

It can be seen from the illustration in FIG. 3 that, in the case of a remote charging operation 46, there is both an interruption 22 of a connection between the inverter 16 of the donor vehicle 10 and the electric drive 12 thereof and of a connection between the inverter 34 of the recipient vehicle 28 and the electric drive 30 thereof (cf. reference symbol 44). The two vehicles, i.e. the donor vehicle 10 and the recipient vehicle 28, are connected via the charging connection 20 in the state illustrated in FIG. 3. The charging connection 20 represents a direct connection between the output sides of the inverter 16 of the donor vehicle 10 and the output side 42 of the inverter 34 of the recipient vehicle 28. A charging current can be transmitted from the donor vehicle 10 to the recipient vehicle 28 via a multiple core charging cable used as charging connection 20, for example. The charging connection 20 is advantageously designed to have a low resistance so that protection against electric shock is provided.

During the remote charging operation 46, a DC voltage is transmitted to the inverter 16 of the donor vehicle 10 from the virtually completely charged high-voltage battery 14, is converted into an AC voltage on the output side, and this is in turn transmitted to the bidirectionally operating inverter 34 of the recipient vehicle 28. Since the inverter 34 of the recipient vehicle 28 is likewise disconnected from the electric drive 30 of the recipient vehicle 28 by a disconnected connection 44, the AC voltage which is transmitted from the inverter 16 of the donor vehicle 10 is converted in the inverter 34 of the recipient vehicle 28 into a DC voltage, with which the virtually completely discharged high voltage transmission battery 32 of the recipient vehicle 28 is charged again. If the previously largely discharged high voltage traction battery 32 of the recipient vehicle 28 is partially charged, once the charging connection 20 between the donor vehicle 10 and the recipient vehicle 28 is disconnected at the output socket 18 or the input socket 26, a DC voltage can be transmitted by the inverter 34 of the recipient vehicle 28 to the electric drive 30 thereof. A busbar like electrical connection 40 extends between the input socket 26 of the recipient vehicle 28 and the inverter 34 thereof. The recipient vehicle 28 is suitable for driving again once the remote charging operation 46 has been performed.

A communications link between the donor vehicle 10 and the recipient vehicle 28 can be produced either via a radio link, in which case this is independent of the charging connection 20 between the donor vehicle 10 and the recipient vehicle 28. Furthermore there is the possibility of a communications link being provided between the donor vehicle 10 and the recipient vehicle 28 via modulation of the charging current which is flowing from the donor vehicle 10 to the recipient vehicle 28. In addition, there is also the possibility of using a core or a plurality of cores of the charging connection 20 to produce a communication between the donor vehicle 10 and the recipient vehicle 28 in the case of a multiple core design of the charging connection 20 between the donor vehicle 10 and the recipient vehicle 28.

With the procedures illustrated using FIGS. 2 and 3, i.e. in the case of the performance of a jump starting operation 36 and in the case of a remote charging operation 46, components can be used which are already installed in hybrid vehicles or in electric vehicles. This means that modification or retrofitting complexity involved for the performance of the remote charging or jump starting method proposed in accordance with the invention is of subordinate importance. Corresponding to the bandwidths in respect of the conversion capacities of the inverters 16 and 34 which are installed in the donor vehicle 10 and the recipient vehicle 28, respectively, the charging current which is transmitted from the donor vehicle 10 to the recipient vehicle 28 can be selected within wide limits. The limiting factor is in this case the discharged high-voltage traction battery 32 since the maximum charging current is less than the maximum discharge current. The higher the charging current transmitted, the shorter the charging times are. Large quantities of energy can be transmitted by the charging connection 20 between the donor vehicle 10 and the recipient vehicle 28 in a short period of time, with the result that, for the vehicle which has broken down, in this case the recipient vehicle 28, it should be unproblematic to reach the next charging station.

The invention is not restricted to the exemplary embodiments described and the aspects highlighted therein. Instead, a large number of modifications which are conventional to a person skilled in the art is possible within the range specified in the claims.

What is claimed is:

1. A method for performing a jump starting operation or a remote charging operation of a recipient vehicle (28) with a discharged high-voltage traction battery (32) using a donor vehicle (10) having a charged high-voltage traction battery (14), said method comprising the following method steps:
    a) interrupting (22) a current path (24) from an inverter (16) to an electric drive (12) of a donor vehicle (10), and
    b) connecting the inverter (16) of the donor vehicle (10) on an output side to an electric drive (30) of the recipient vehicle (28), operating the inverter (16) of the donor vehicle (10) in a virtual driving operation mode and starting the electric drive (30) of the recipient vehicle (28), or
    c) connecting the inverter (16) of the donor vehicle (10) on the output side to an inverter (34) of the recipient vehicle (28), operating the inverter (16) of the donor vehicle (10) in the virtual driving operation mode and operating the inverter (34) of the recipient vehicle (28) in a virtual recuperation operation mode for charging the discharged high-voltage traction battery (32).

2. The method according to claim 1, characterized in that, according to method step a), interruption (22) of the current path (24) to the electric drive (12) of the donor vehicle (10) is performed by means of a plug, a contactor, a relay or a switch.

3. The method according to claim 1, characterized in that the donor vehicle (10) and the recipient vehicle (28) are connected to one another via a charging connection (20), which contains additional cores for producing a communication between the donor vehicle (10) and the recipient vehicle (28).

4. The method according to claim 1, characterized in that the inverters (16, 34) in the driving operation mode convert DC voltage from the high-voltage fraction battery (14, 32) into an AC voltage for electric drives (12, 30).

5. The method according to claim 1, characterized in that, in the case of a direct connection of the inverters (16, 34), a DC voltage is converted into an intermediate voltage, which is then converted into a different DC voltage.

6. The method according to claim 1, characterized in that the inverters (16, 34) in the recuperation operation mode convert an AC voltage generated by the electric drives (12, 30) during generator operation into a DC voltage, with which the high-voltage traction batteries (14, 32) are charged.

7. The method according to claim 1, characterized in that communication between the donor vehicle (10) and the recipient vehicle (28) takes place by means of the charging connection (20) via modulation of the charging current.

8. The method according to claim 1, characterized in that communication between the donor vehicle (10) and the recipient vehicle (28) takes place via a radio link.

9. The method according to claim 1, characterized in that, during the remote charging operation (46) according to method step c), the electric drives (12, 30) of the donor vehicle (10) and the recipient vehicle (28) are disconnected from the respective inverters (16, 34).

10. The method according to claim 1, characterized in that, in the case of a direct connection of the inverters (16, 34), a DC voltage is converted into an AC voltage, which is then converted into a different DC voltage.

11. A method for performing a jump starting operation or a remote charging operation of a recipient vehicle (28) with a discharged high-voltage traction battery (32) using a donor vehicle (10) having a charged high-voltage traction battery (14), said method comprising the following method steps:
   a) interrupting (22) a current path (24) from an inverter (16) to an electric drive (12) of a donor vehicle (10), and
   b) connecting the inverter (16) of the donor vehicle (10) on an output side to an electric drive (30) of the recipient vehicle (28), operating the inverter (16) of the donor vehicle (10) in a virtual driving operation mode and starting the electric drive (30) of the recipient vehicle (28).

12. A method for performing a jump starting operation or a remote charging operation of a recipient vehicle (28) with a discharged high-voltage traction battery (32) using a donor vehicle (10) having a charged high-voltage traction battery (14), said method comprising the following method steps:
   a) interrupting (22) a current path (24) from an inverter (16) to an electric drive (12) of a donor vehicle (10), and
   b) connecting the inverter (16) of the donor vehicle (10) on an output side to an inverter (34) of the recipient vehicle (28), operating the inverter (16) of the donor vehicle (10) in the virtual driving operation mode and operating the inverter (34) of the recipient vehicle (28) in a virtual recuperation operation mode for charging the discharged high-voltage traction battery (32).

* * * * *